United States Patent [19]

Nakazawa et al.

[11] Patent Number: 4,622,166

[45] Date of Patent: Nov. 11, 1986

[54] PROCESS FOR PREPARATION OF ZEOLITE SLURRY EXCELLENT IN STATIC STABILITY AND DYNAMIC STABILITY

[75] Inventors: Tadahisa Nakazawa, Tokyo; Koichi Usui; Masahide Ogawa, both of Shibata; Kiyoshi Abe; Takashi Tokita, both of Nakajo, all of Japan

[73] Assignee: Mizusawa Kagaku Kogyo Kabushiki Kaisha, Osaka, Japan

[21] Appl. No.: 626,490

[22] Filed: Jul. 5, 1984

Related U.S. Application Data

[63] Continuation of Ser. No. 359,125, Mar. 17, 1982.

[51] Int. Cl.[4] .......... B01J 13/00; C01D 7/16

[52] U.S. Cl. .......... 252/313.1; 252/179; 252/174.25

[58] Field of Search .......... 252/313 R, 259.5, 174.25, 252/179, 184

[56] References Cited

U.S. PATENT DOCUMENTS

| | | | |
|---|---|---|---|
| 3,962,132 | 6/1976 | Haschke | 252/174.25 X |
| 4,000,094 | 12/1976 | Fleming | 252/174.25 X |
| 4,072,622 | 2/1978 | Kuhling | 252/179 |
| 4,215,007 | 7/1980 | Krings | 252/174.25 |
| 4,219,535 | 8/1980 | Sugahara | 252/174.25 X |

*Primary Examiner*—John F. Terapane
*Assistant Examiner*—Catherine S. Kilby
*Attorney, Agent, or Firm*—Sherman and Shalloway

[57] ABSTRACT

Disclosed is a process for the preparation of a zeolite slurry being excellent in either the static stability or the dynamic stability and having a good flowability, which comprises neutralizing an aqueous cake or slurry containing water and zeolite in such a state that both are substantially inseparable from each other by filtration, with an inorganic or organic acid or an acid anhydride or acidic salt thereof so that the pH value of the zeolite slurry at the time of completion of addition of said acid, acid anhydride or acidic salt is in the range of from 9.5 to 12 and the pH value of the zeolite slurry in the stationary state after addition of said acid, acid anhydride or acidic salt is in the range of from 11.3 to 12.7, adding a water-soluble or water-dispersible organic polymeric dispersant in an amount of at least 0.1% by weight based on the anhydrous zeolite to the neutralized zeolite slurry, and subjecting the resulting slurry to highly shearing stirring.

14 Claims, 2 Drawing Figures

PROCESS FOR PREPARATION OF ZEOLITE SLURRY EXCELLENT IN STATIC STABILITY AND DYNAMIC STABILITY

This application is a continuation, of application Ser. No. 359,125, filed Mar. 17, 1982.

BACKGROUND OF THE INVENTION (1) Field of the Invention

The present invention relates to a process for the preparation of an aqueous slurry of zeolite which is excellent in the suspension stability, especially in the combination of static stability and dynamic stability and which has a relatively low vicosity stably even at normal temperatures and shows a good flowability. Furthermore, the present invention relates to a process for the preparation of a zeolite builder slurry which can advantageously be used for the manufacture of detergents.

(2) Description of the Prior Art

It has been known from old that a water-insoluble alkali metal aluminosilicate such as zeolite has an excellent metal ion sequestering capacity and exerts a high buffering action and a good re-contamination preventing effect under alkaline conditions and that the water-insoluble alkali metal aluminosilicate can effectively be used as a detergent builder by dint of these excellent characteristics.

However, there are involved various problems to be solved in manufacture and transportation of zeolite builders. Zeolite is a substance having a dilatant characteristic and it is difficult to sufficiently remove water from crystallized zeolite by such means as filtration, and if the filter cake of zeolite is allowed to stand still under no application of an external force, the filter cake is converted to a mud-like product. Accordingly, in order to obtain a dry powder of zeolite, it is necessary to adopt costly drying means such as spray drying. Zeolite particles tend to agglomerate under drying, but from the viewpoint of the builder characteristics, it is preferred that zeolite particles be as small as possible. Accordingly, the spray-dry product of zeolite should be subjected to a pulverizing treatment which requires a long time. Moreover, the fine dry powder of zeolite is very bulky, and therefore, the transportation expenses are increased and the working environment is polluted by dusting on handling or transportation of the fine dry powder of zeolite.

As means for eliminating the foregoing disadvantages caused when powdery zeolite is handled, there has been adopted a method in which crystallized zeolite is handled in the form of an aqueous slurry. However, also in this case, there arise other problems to be solved. Zeolite particles have a tendency to precipitate in water and when an external force is applied by vibrations or the like during transportation, the particles aggregate densely to form a very hard precipitation cake. Therefore, when zeolite is handled in the form of an aqueous slurry, it often happens that even discharge of zeolite from a vessel becomes difficult.

Many trials have been made to form an aqueous liquid of zeolite. In these trials, various surfactants or dispersants are used so as to prevent precipitation of zeolite particles. For example, there are known a method in which a carboxyl group-containing water-soluble polymer such as carboxymethyl cellulose, a water-swellable laminar clay mineral such as bentonite or a non-ionic surface active agent such as an ethylene oxide adduct of a higher alcohol is added as a stabilizing agent to an aqueous slurry of zeolite (see U.S. Pat. No. 4,072,622), a method in which a water-soluble alkali metal salt such as sodium carbonate and a non-ionic surface active agent are added in combination to an aqueous slurry of zeolite for attaining a stabilizing effect (see Japanese Patent Application Laid-Open Specification No. 155200/79) and a method in which an organic flocculating agent such as polyacrylamide, polyacrylic acid or an acrylic acid copolymer is added to an aqueous slurry of zeolite (see Japanese Patent Application Laid-Open Specification No. 84533/80).

These known methods are still insufficient in that when a dispersion stabilizer such as mentioned above is added to an aqueous slurry of zeolite, the viscosity of the slurry is extraordinarily increased and in order to keep this aqueous slurry flowable, it is necessary to maintain the aqueous slurry at a high temperature or perpetually conducted gentle stirring. Moreover, these known methods are defective in that the effect of preventing precipitation of particles when the resulting aqueous slurry is allowed to stand under stationary conditions, that is, the static stability, and the effect of preventing precipitation of particles when the resulting aqueous slurry is allowed to stand under dynamic conditions, that is, under application of vibrations or other external forces caused on transportation, are not satisfactory.

Japanese Patent Application Laid-Open Specification No. 64504/79 discloses an aqueous slurry of zeolite stabilized against precipitation, which is formed by dispersing zeolite particles in an aqueous solution of sodium silicate. This aqueous slurry shows a good stability for short-time storage, but when it is stored for a long time, type A zeolite is changed to type Pc zeolite or analcime and the ion exchange capacity is drastically reduced, and occurrence of precipitation and aggregation becomes conspicuous.

SUMMARY OF THE INVENTION

It is therefore a primary object of the present invention to provide an aqueous slurry of zeolite which is excellent in the suspension stability, especially in the combination of static stability and dynamic stability, and which has a relatively low viscosity even at normal temperatures and shows a good flowability.

Another object of the present invention is to provide an aqueous slurry of zeolite for manufacture of detergents, in which aggregation, precipitation and deterioration of zeolite particles can be prevented effectively even under either static or dynamic conditions and a high suspension stability of fine zeolite particles and excellent properties required for a detergent builder can be stably maintained in the state where the viscosity is low.

Still another object of the present invention is to provide a process for the preparation of the above-mentioned aqueous slurry of zeolite, in which the intended aqueous slurry can be prepared by a relatively simple operation at a low cost.

In accordance with the present invention, there is provided a process for the preparation of a zeolite slurry being excellent in either the static stability or the dynamic stability and having a good flowability, which comprises neutralizing an aqueous cake or slurry containing water and zeolite in such a state that both are substantially inseparable from each other by filtration, with an inorganic or organic acid or an acid anhydride or acidic salt thereof so that the pH value of the zeolite slurry at the time of completion of addition of said acid, acid anhydride or acidic salt is in the range of from 9.5 to 12 and the pH value of the zeolite slurry in the stationary state after addition of said acid, acid anhydride or acidic salt is in the range of from 11.3 to 12.7, adding a water-soluble or water-dispersible organic polymeric dispersant in an amount of at least 0.1% by weight based on the anhydrous zeolite to the neutralized zeolite slurry, and subjecting the resulting slurry to highly shearing stirring.

DETAILED DESCRIPTION OF THE PREFERRED EMBODIMENTS

The present invention will now be described in detail.

One of the important features of the process of the present invention resides in the novel finding that when zeolite in the form of an aqueous slurry is neutralized with an inorganic or organic acid or an acid anhydride or acidic salt thereof (often referred to as "acid" hereinafter) so that the pH value (P1) of the zeolite slurry at the time of completion of addition of the acid is in the range of from 12 to 9.5, especially from 11.5 to 10, and the pH value (P2) of the zeolite slurry in the stationary state after addition of the acid, for example, after passage of 4 hours from the time of addition of the acid, is in the range of from 12.7 to 11.3, especially from 12.5 to 11.5, and that the difference between the values P1 and P2 is preferably in the range of from 0.7 to 1.3, the suspension stability of the slurry can be prominently improved without substantial increase of the viscosity of the slurry.

Figure 1:
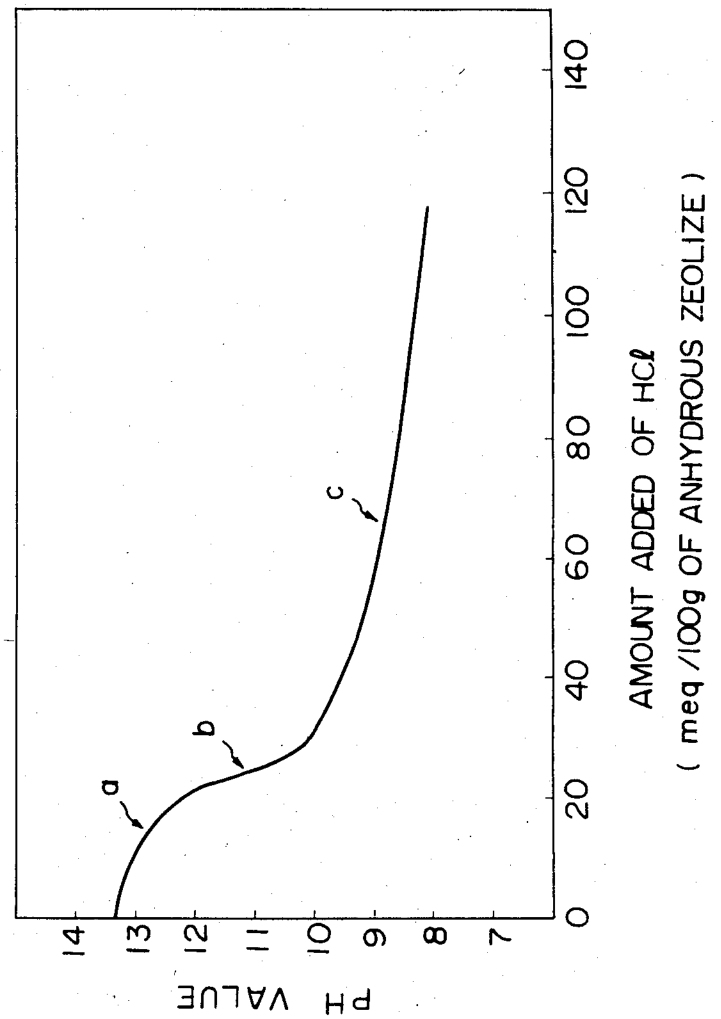
FIG. 1 is a titration curve illustrating the relation between the amount added of hydrochloric acid (meq/100 g of anhydrous zeolite) and the pH value, which is observed when 20% hydrochloric acid (6.04N) is gradually added at a rate of about 2.1 ml/min to 500 g of base zeolite slurry A-1 used in Example 1 (having an anhydrous zeolite concentration of 40.6%, a free alkali concentration of 0.28%, a specific gravity of 1.352 as measured at 25° C. and a viscosity of about 94 cP as measured at 25° C.).

The alkali ion ($Na^+$) present in the aqueous slurry of zeolite is roughly divided into the following three types; (a) the alkali ion dissolved in the aqueous phase, (b) the alkali ion built in the crystal structure of zeolite particles and (c) the alkali ion present in the interface between the zeolite particles and the aqueous phase. When an aqueous slurry of zeolite is titrated with an acid such as hydrochloric acid and the amount added of hydrochloric acid and the pH value of the slurry are plotted on the abscissa and ordinate, respectively, a curve as shown in FIG. 1 is obtained. Referring to FIG. 1, it may be said that the portion a of a gentle inclination in the high pH value region corresponds to the free alkali ion (a) present in the aqueous phase, the portion c of a gentle inclination in the low pH value region corresponds to the alkali ion (b) built in the crystalline structure of zeolite particles, and the portion b of a relatively sharp inclination, which mediates between the portions a and c, corresponds to the alkali ion (c) present in the interface between the zeolite particles and the aqueous phase. In fact, the finer is the particle size of the dispersed zeolite particles, the larger is the amount added of hydrochloric acid corresponding to the portion b of the titration curve.

Figure 2:
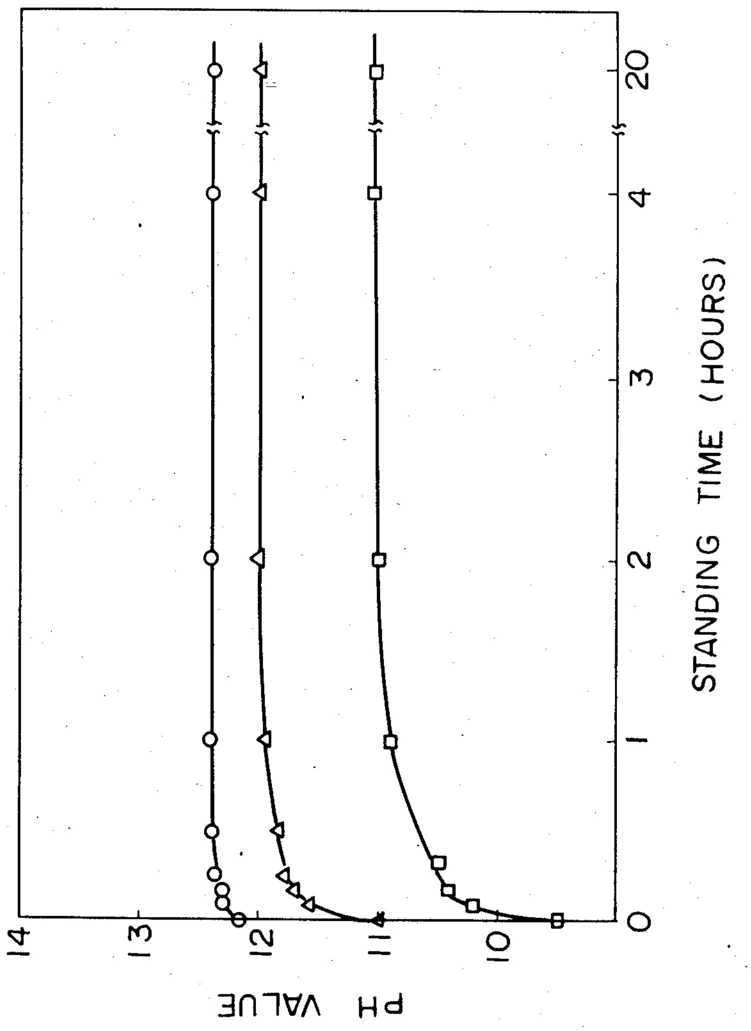
FIG. 2 is a curve showing the change of the pH value with the lapse of time, which is observed when 10.2, 13.3 or 20.2 ml of 20% hydrochloric acid is dropped at a rate of 4.5 ml/min to the above-mentioned slurry A-1 to form a slurry having a pH value of 12.2, 11.0 or 9.5 and the resulting slurry is allowed to stand still.

When an aqueous slurry of zeolite is neutralized to various pH values with an acid such as hydrochloric acid and changes of the pH values with the lapse of time are examined, a pH value-time curve as shown in FIG. 2 is obtained. From the results shown in FIG. 2, it will readily be understood that when the neutralization is conducted to the pH value region corresponding to the free alkali ion (a), there is no prominent difference between the pH value at the time of termination of the neutralization and the pH value after passage of a certain time, whereas if the neutralization is conducted to the pH value region corresponding to the portion b or c of the titration curve, with the lapse of time from the point of completion of addition of the acid, the pH value of the slurry is increased again and finally saturated at a level higher than the pH value at the time of completion of addition of the acid, and it will also be understood that when the neutralization is conducted to the pH value region corresponding to the portion c of the titration curve, re-increase of the pH value is larger than in the case where the neutralization is conducted to the pH value region corresponding to the portion b of the titration curve.

The pH value region to which the neutralization of the zeolite slurry is effected with the acid according to the present invention mediates between the portions a and c of the above-mentioned titration curve. It may be said that in this pH value region, the alkali metal ion built in the crystalline structure of zeolite particles is not substantially neutralized but all of the free alkali metal ion in the zeolite slurry and at least a part of the alkali metal ion present on the surfaces of the zeolite particles are neutralized.

If the neutralization of the zeolite slurry is effected with the acid so that the pH value is in the above-mentioned range at the time of completion of addition of the acid, the suspension stability of the zeolite particles is remarkably improved without abnormal increase of the viscosity of the final slurry. More specifically, when the pH value at the time of completion of addition of the acid is too high and exceeds the above range, it is difficult to adjust the pH value of the final slurry within the range specified in the present invention, and even if a water-soluble dispersant is added to this neutralized slurry, the static suspension stability is degraded and when the slurry is allowed to stand still for 1 to 4 days, precipitation of zeolite particle aggregated and coagulated solidly to the vessel is caused. When the pH value at the time of completion of addition of the acid is too low and below the above-mentioned range, it is difficult to adjust the pH value of the final slurry within the range specified in the present invention, and if a water-soluble organic dispersant is added to the neutralized slurry, the dynamic suspension stability is degraded and when the slurry is shaken for 16 hours or a longer time, a strong aggregate of precipitated particles is formed.

It will also be understood from the facts described below that in order to prepare a zeolite slurry having an excellent suspension stability and a low viscosity, it is important that the zeolite should be neutralized with the acid so that the above-mentioned pH value requirement is satisfied. As pointed out hereinbefore, it has been known that the suspension stability of zeolite particles can be improved by addition of a water-soluble alkali metal salt to a zeolite slurry. However, if the alkali metal salt is added to a zeolite slurry in an amount sufficient to prevent aggregation and precipitation of zeolite particles, the viscosity of the slurry is abnormally increased to, for example, 10,000 cP or a higher level at normal temperatures and the slurry substantially loses the flowability at normal temperatures. When it is intended to handle this slurry in the flowable state, there must be adopted a disadvantageous operation of maintaining the slurry at a temperature higher than 30° C. This tendency is similarly observed when a non-ionic surface active agent is added to a zeolite slurry as the suspension stability for zeolite particles. This will readily be understood from the fact that an alkali metal salt or non-ionic surface active agent in an aqueous solution has a layer of a large quantity of water on the periphery thereof. In contrast, the zeolite slurry prepared according to the process of the present invention has a relatively low viscosity of 50 to 5000 cP at 20° C. and it has a good flowability suitable for handling, and the zeolite slurry according to the present invention is especially excellent in the suspension stability.

When a zeolite slurry is washed repeatedly to remove the alkali metal component so that the pH value of the slurry is adjusted within the above-mentioned range, even if a water-soluble organic dispersant is added to this slurry, the static stability of the slurry is very low and even after passage of only one day, solidly aggregated particles are precipitated. Also from this fact, it will be understood that in order to improve the suspension stability, it is important that the alkali metal component contained in the zeolite slurry should be neutralized with a predetermined amount of the acid so that the pH value is within the range specified in the present invention.

The reason why the suspension stability of zeolite particles is prominently improved in the present invention by neutralizing a zeolite slurry with the acid so that the pH value is within the above-mentioned range has not completely been elucidated. However, it is believed that in the zeolite slurry neutralized with the acid, there is present a water-soluble salt which is formed by the reaction of the alkali metal component with the acid and this water-soluble salt will probably exert a function of improving the suspension stability. However, in view of the fact that a highly prominent effect of improving the suspension stability can be attained with a smaller amount of the water-soluble alkali metal salt in the present invention as compared with the case where a water-soluble alkali metal salt is externally added to the slurry, it is deemed that chemical and physical properties on the surfaces of zeolite particles will probably be changed and the improvement of the suspension stability will be due mainly to such changes of chemical and physical properties. As pointed out hereinbefore, when the neutralization conditions specified in the present invention are adopted, all of the free alkali metal ion and at least a part of the alkali metal ion on the surfaces of the zeolite particles are neutralized, and if this neutralized slurry is allowed to stand still, the pH value increases with the lapse of time. This apparently indicates that the alkali metal ion ($Na^+$) on the surfaces of the zeolite particles is substituted by the hydrogen ion ($H^+$) in the liquid phase. In the present invention, it is believed that the surface proton type zeolite particles are stably suspended and this suspension stability is promoted with the aid of the water-soluble alkali metal salt present in the liquid phase and the polymeric dispersant to be added afterward.

As the zeolite slurry that is used as the starting material in the present invention, there may be mentioned a slurry formed by stirring a wet cake in the process for the production of zeolite. Ordinarily, zeolite is prepared by preparing a homogeneous liquid composition where alumina, silicic acid and alkali metal components and water are contained at a zeolite-forming ratio, and heating the homogeneous composition to crystallize zeolite. The filter cake of zeolite is obtained by subjecting the liquid containing the crystallized zeolite to filtration, centrifugal separation liquid removal treatment using a filter press, a belt filter, a drum filter, a leaf filter or a centrifugal separator.

Because of the dilatancy characteristic, this wet filter cake still contains a considerable amount of water inseparable by filtration or centrifugal separation. According to the present invention, the zeolite particles are slurried by using this residual water as the dispersion medium. The concentration of the zeolite particles in the starting slurry is such that this inseparable water is substantially contained. More specifically, the concentration of the zeolite particles in the anhydrous state is 30 to 50% by weight, especially 37 to 45% by weight. If the concentration is too high and beyond the above range, the viscosity of the slurry is too high and handling of the slurry is difficult. On the other hand, if the concentration is too low and below the above range, separation of the supernatant is readily caused and attainment of the objects of the present invention becomes difficult. Furthermore, in this case, an excessive amount of water should be transported and handled, resulting in economical disadvantages.

In the present invention, it is preferred that in the starting zeolite slurry, the concentration of the free alkali ion concentration in the mother liquor be 0.1 to 1.0% by weight, especially 0.2 to 0.7% by weight, as determined according to the method described hereinafter. If the amount of the free alkali metal ion is too small and below the above range, even if the neutralization treatment is carried out, the suspension stability is hardly improved to a satisfactory level, and if the amount of the free alkali metal ion is too large and beyond the above range, the viscosity of the final slurry becomes too high and handling of the slurry becomes difficult.

The present invention can be applied to aqueous slurries of various synthetic zeolites, and can especially advantageously be applied to zeolites for detergent builders. In view of the metal ion sequestering capacity, it is preferred that the CaO binding capacity (exchangeability) of the zeolite for a detergent builder be at least 100 mg/g, especially 120 to 180 mg/g, as calculated on the anhydride base.

The metal ion sequestering capacity of the zeolite differs depending on the type of the crystal structure, and it is known that the type A zeolite has a higher capacity, the capacity of the type X zeolite comes next and the type Y zeolite has a lowest capacity. In the present invention, it is preferred that the zeolite used be composed solely of the type A zeolite or of a mixture of the type A zeolite and the type X or Y zeolite.

The present invention may be applied to optional zeolite particles having a primary particle size (as measured by an electron microscope) of at least 1 micron, but especially good results are obtained when the present invention is applied to fine zeolite particles having a primary particle size smaller than 1 micron. Zeolite having such fine particle size has a high ion exchange speed and is excellent in the properties required for builders. However, their tendency to aggregate is conspicuous and the viscosity of a slurry of such fine particles is much higher than the viscosity of a slurry of zeolite particles having a larger particle size, when the comparison is made based on the same solid concentration. According to the present invention, even if such fine zeolite particles are used, there can be obtained a zeolite slurry having no tendency of primary particles to aggregate and a relatively low viscosity, which can be handled very easily.

A fine particulate zeolite that can be used advantageously for attaining the objects of the present invention is one prepared according to the process disclosed in the specification of U.S. Pat. No. 4,102,977, which comprises acid-treating a smectic clay mineral under such conditions that at least the X-ray diffraction peak of plane index [001] substantially disappears, to form activated silicic acid or activated aluminosilicic acid, treating the obtained activated silicic acid or aluminosilicic acid with an alkali metal hydroxide or a water-soluble alkali metal silicate to form an alkali metal polysilicate or alkali metal polyaluminosilicate where the $Na_2O/SiO_2$ molar ratio is in the range of from 1/3.5 to 1/500, adding additional alumina component and alkali metal component and water to the alkali metal polysilicate or alkali metal polyaluminosilicate to form a homogeneous composition in which the respective components are contained at a type A zeolite-forming ratio, and heating the homogeneous composition to crystallize out a fine particulate zeolite having a primary particle size smaller than 1$\mu$.

In the present invention, it is preferred that the wet cake obtained in the above process for the production of zeolite be directly used as the starting slurry. Furthermore, a slurry having a higher concentration, which is obtained by adding a dry zeolite powder to this wet cake, may be used. Moreover, an aqueous slurry formed by dispersing a dry zeolite powder in water may be used as the starting material in the present invention.

In the present invention, an inorganic acid, an organic acid or an acid anhydride or acidic salt thereof is used for neutralization of the zeolite slurry. As the inorganic acid, there can be mentioned, for example, carbonic acid, sulfuric acid, sulfurous acid, hydrochloric acid, hydrobromic acid, hypochlorous acid, chloric acid, boric acid, nitric acid, phosphoric acid, phosphorous acid and metaphosphoric acid. As the organic acid, there can be mentioned, for example, acetic acid, propionic acid, oxalic acid, citric acid, tartaric acid, succinic acid, maleic acid, malic acid, gluconic acid, itaconic acid, thioglycolic acid, ethylenediamine-tetraacetic acid, nitrilotriacetic acid, diglycolic acid, sulfoitaconic acid, trimellitic acid and pyromellitic acid. As the acid anhydride, there can be mentioned, for example, carbon dioxide (carbonic acid gas), sulfurous acid gas, chlorine, acetic anhydride and succinic anhydride. As the acidic salt, there can be mentioned, for example, sodium bicarbonate, sodium hydrogensulfite and sodium dihydrogenphosphate. The acid may be directly added to the zeolite slurry, but it is ordinarily preferred that the acid be gradually added in the form of an aqueous solution to the zeolite slurry with stirring.

Among the above-mentioned various acids, carbon dioxide gas is especially preferred. Carbon dioxide gas acts as an acid for the first time when it is dissolved in water and converted to carbonic acid. In case of other acids, there is a risk of their reacting with zeolite particles prior to reaction with the free alkali metal component in the slurry, resulting in local reduction of the pH value of the slurry. However, there is not such risk in case of carbon dioxide. Therefore, carbon dioxide is especially suitable for the treatment of the present invention. Moreover, when carbon dioxide is used for neutralization, the suspension stability of the final zeolite slurry is improved prominently as compared with the case where other acids are used. Addition of carbon dioxide to the slurry can easily be accomplished by blowing carbon dioxide gas into the zeolite slurry.

It is sufficient if the acid is added to the zeolite slurry in such an amount as providing the above-mentioned pH value. More specifically, the amount added of the acid selected within the range of from 7 to 45 meq/100 g, especially from 8 to 20 meq/100 mg, based on the anhydrous zeolite, so that the pH value is within the above-mentioned range.

Another characteristic feature of the present invention is that the so obtained neutralized slurry is mixed with a water-soluble or water-dispersible organic polymeric dispersant in an amount of at least 0.1% by weight, especially 0.15 to 2% by weight, based on the anhydrous zeolite, and the slurry is subjected to highly shearing stirring. Although the above-mentioned neutralized zeolite slurry is excellent in the static stability, aggregation or precipitation of zeolite particles is caused under dynamic conditions, for example, under external forces such as vibrations. However, if the polymeric dispersant is incorporated in the neutralized slurry according to the present invention, the dynamic stability can be prominently improved.

As the water-soluble or water-dispersible organic polymeric dispersant, there can be mentioned, for example, water-soluble polymers having at least one of carboxyl, hydroxyl and ether groups, such as carboxymethyl cellulose (CMC), methyl cellulose, ethyl cellulose, hydroxyethyl cellulose, various starches, cyanoethylated starch, carboxymethylated starch, sodium alginate, tragacanth gum, gum arabic, glue, casein, gelatin, polyvinyl alcohol, partially hydrolyzed polyvinyl acetate, partially acetalized polyvinyl alcohol, polyvinylmethyl ether, a vinylmethyl ether/maleic acid copolymer, polyvinyl pyrrolidone, polyacrylamide and a water-soluble acrylic resin. In the present invention, these organic dispersants may be used singly or in the form of a mixture of two or more of them. For attaining the objects of the present invention, among the foregoing organic dispersants, polymers having both the carboxyl and hydroxyl groups, such as carboxymethyl cellulose and carboxymethylated starch, are especially preferred.

From the viewpoint of the suspension stability of the final slurry, it is important that the organic polymeric dispersant should be incorporated in an amount of at least 0.1% by weight based on the anhydrous zeolite. If the amount of the dispersant exceeds 2% by weight, the viscosity of the slurry is apt to increase. Therefore, incorporation of such a large amount of the dispersant should be avoided.

In the present invention, by incorporating the organic polymeric dispersant into the above-mentioned neutralized slurry, the dynamic stability of the zeolite particles can be improved. The reason is considered as follows.

As described hereinbefore, it is considered that protons are present at considerably high concentrations on the surfaces of the particles of the slurry which has been neutralized under the above-mentioned conditions. On the other hand, the organic polymeric dispersant contains a polar group acting as the acceptor because of the existence of a hydrogen bond, such as a carboxyl, hydroxyl or ether group. Accordingly, in the slurry according to the present invention, it is considered that a hydrogen bond or any other bond is formed between zeolite particles and the polymeric dispersant and by dint of this bond, the zeolite particles are stabilized against precipitation even if a dynamic external force is applied to the slurry. In case of such a dispersant as carboxymethyl cellulose, it is considered that since there are present many carboxyl groups taking an important role for dissolution and dispersion and many hydroxyl groups capable of effectively forming hydrogen bonds with the zeolite particles in the slurry, an especially excellent dispersion stability will be obtained.

The water-soluble polymeric dispersant may be added in the form of a powder, a solution or a dispersion. In order to prevent dilution of the slurry, it is ordinarily preferred that the water-soluble polymeric dispersant be added in the form of a powder.

In order to form a stabilized final slurry from the organic dispersant-incorporated slurry, it is important that the organic dispersant-incorporated slurry should be subjected to highly shearing stirring. The shearing stirring can be accomplished by using, for example, a colloid mill, a homogenizer, a dispersion mill, a dispersion mixer, a Kady mill or the like. The stirring is performed under such conditions that the peripheral speed of the shearing blade or rotor is at least 10 m/sec, especially at least 15 m/sec.

The aqueous zeolite slurry obtained according to the present invention contains 30 to 50% by weight, especially 37 to 45% by weight, of the zeolite as the anhydride based on the total slurry, 7 to 45 meq/100 g, especially 8 to 20 meq/100 g, of the alkali metal salt of the inorganic acid or organic acid based on the anhydrous zeolite, and at least 0.1% by weight, especially 0.15 to 2% by weight, of the water-soluble or water-dispersible organic polymeric dispersant based on the anhydrous zeolite. This slurry has a relatively low pH value of 12.7 to 11.3, especially 12.5 to 11.5, and a relatively low viscosity of 50 to 5000 cP, especially 80 to 2000 cP, as measured at 20° C. Furthermore, the slurry has a good flowability suitable for such operations as transportation, discharge and feeding even at normal temperatures. Still further, the slurry according to the present invention is advantageous in that when it is subjected to the static stability test and dynamic stability test described in detail hereinafter, no precipitate is formed or even if precipitate is caused, the amount of the precipitated solids is only a trace.

Since the alkali metal salt and the polymeric dispersant contained in the slurry according to the present invention are components ordinarily used for a detergent composition, when the zeolite slurry of the present invention is used as a detergent builder, incorporation of an undesirable ingredient into the detergent composition can be prevented. Furthermore, since the additive that is used in the present invention does not cause such a bubbling phenomenon as caused by a surface active agent, formation of bubbles is controlled during the preparation process or at the time of transportation and handling of the slurry is greatly facilitated.

Moreover, the alkali metal salt and the polymeric dispersant that are contained in combination in the slurry according to the present invention provide a very excellent spray-dry granulating characteristic when the zeolite slurry of the present invention is used as the base for production of a granular detergent, and a granulated product having an adequate dispersibility and a high resistance to powdering can be obtained.

The present invention will now be described in detail with reference to the following Examples that by no means limit the scope of the invention.

EXAMPLE 1

In this Example, a synthetic zeolite slurry for a detergent builder was prepared by using an acid clay produced at Nakajo-machi, Niigata-ken, Japan as the smectite clay mineral.

The starting acid clay produced at Nakajo-machi, Niigata-ken, Japan, which was used in this Example, contained 45% by weight of water in the as-collected state, and the main ingredient contents based on the dry product were 72.1% by weight of $SiO_2$, 14.2% by weight of $Al_2O_3$, 3.87% by weight of $Fe_2O_3$, 3.25% by weight of MgO and 1.06% by weight of CaO, the ignition loss being 3.15% by weight. The acid clay was molded into columns having a diameter of 5 mm and a length of 5 to 20 mm, and 1250 Kg calculated as the dry product of the molded clay was charged in a lead-lined wood tank having a capacity of 5 $m^3$, and 3300 l of an aqueous solution of sulfuric acid having a concentration of 47% by weight was added to the clay. The mixture was heated at 90° C. and the clay was acid-treated in the granular state for 40 hours. By decantation using a dilute aqueous solution of sulfuric acid and water, a sulfuric acid salt of a basic component reacted with sulfuric acid was washed away and removed, and the mixture was washed with water until the sulfuric radical was not detected, whereby a granular acid-treated clay product was obtained. This acid-treated product will be referred to as "activated silicic acid" hereinafter (containing 50% of water).

For preparation of zeolite, water was added to the activated silicic acid so that the concentration was 20%, and the activated silicic acid was wet-pulverized by using a ball mill to obtain a slurry A of the activated silicic acid.

Then, 796 Kg of the so obtained slurry was charged in a stainless steel vessel having a capacity of 2 $m^3$, and 46.6 Kg of a commercially available solution of caustic soda (containing 49% of NaOH) was added to the slurry. The mixture was stirred at 60° C. for 6 hours to obtain a slurry of an alkali metal polysilicate corresponding to $Na_2O.8.8SiO_2$.

The following ingredient molar ratios (based on the oxides) were chosen as one of the conditions for preparing a synthetic zeolite for a detergent builder:

$Na_2O/SiO_2=0.9$
$SiO_2/Al_2O_3=2.0$
$H_2O/Na_2O=50.0$

An alkali metal aluminate solution formed by adding dissolving commercially available aluminum hydroxide to a commercially available solution of caustic soda was used as the solution to be added to the alkali metal polysilicate slurry for attaining the above molar ratios. This solution contained 18.54% of $Na_2O$, 19.1% of $Al_2O_3$ and 62.4% of $H_2O$ and the $Na_2O/Al_2O_3$ molar ratio was 1.6/1.

PROCESS FOR PREPARATION OF SYNTHETIC ZEOLITE FOR DETERGENT BUILDER

Water was added to the alkali metal polysilicate slurry so that the $SiO_2$ concentration was 10%, and the slurry was charged into a stainless steel vessel having a capacity of 3.5 $m^3$. Water was added to the above-mentioned alkali metal aluminate solution to form a solution having an $Na_2O$ concentration of 12.5% and an $Al_2O_3$ concentration of 12.8%. This solution was added at 20° C. with stirring to the slurry over a period of about 80 minutes. The mixture temporarily passed through a state of gel and a homogeneous slurry was finally obtained. The slurry was heated at 95° C. and reaction was conducted for 5 hours with stirring, whereby zeolite crystal particles were formed. Then, the reaction product was washed with water and filtered, and water was sufficiently removed to obtain a filter cake (having a water content of 59.4% based on the anhydrous zeolite obtained by drying at 800° C.).

Then, about 100 Kg of the obtained filter cake was charged in a 100-liter stainless steel vessel equipped with a stirrer and was stirred to form a slurry having a solid concentration of 40% by weight.

Then, 1 Kg of this zeolite slurry A-1 (having a pH value of 13.2 as measured at 20° C. and a free alkali content of 0.28%) was charged in a stainless steel vessel, and an aqueous solution of sulfuric acid having a concentration of 20% by weight was dropped at a rate of 4.8 ml/min to the slurry with stirring. When 11.1 ml of the solution was added, the pH value of the zeolite slurry was 11.0. When the slurry was allowed to stand still, the pH value was increased and stabilized after passage of 4 hours. At this point, the pH value of the slurry was 12.2.

This slurry H-1 was mixed with 0.5% by weight, based on the anhydrous zeolite, of carboxymethyl cellulose (CMC#1150 supplied by Daicel K.K.), and the mixture was subjected to a dispersing treatment by using a home mixer to obtain a zeolite slurry 1-1 having an improved stability.

Separately, sulfuric acid was added to the above-mentioned slurry A-1 so that the pH value was 12.8, 11.6, 10.3, or 9.4, whereby stabilized samples H-2, 1-2, 1-3 and H-3 were obtained.

With respect to each sample, the pH value, the viscosity, the static stability, the dynamic stability, the concentration of the zeolite calculated as the dry product, the primary particle size of the zeolite, the calcium exchange capacity and the exchange speed were determined. The obtained results are shown in Table 1.

For comparison, 0.5% of carboxymethyl cellulose was directly added to the slurry A-1 and the mixture was subjected to the dispersing treatment to obtain a sample H-4.

Incidentally, the samples H-1 through H-4 were comparative samples.

TABLE 1

| | Base Slurry | Samples of Present Invention | | |
|---|---|---|---|---|
| Sample No. | A-1 | 1-1 | 1-2 | 1-3 |
| Neutralizing Agent | | | | |
| kind | — | sulfuric acid | sulfuric acid | sulfuric acid |
| amount (meq/100 g of anhydrous zeolite) | — | 12.8 | 9.0 | 18.6 |
| pH Value of Slurry | | | | |
| just after completion of addition of neutralizing agent | — | 11.0 | 11.6 | 10.3 |
| after 4 hours | — | 12.2 | 12.5 | 11.5 |
| Addition of Carboxymethyl Cellulose | — | added | added | added |
| Viscosity (cP at 20° C.) after preparation | 94 | 253 | 219 | 252 |
| Anhydrous Zeolite Concentration (%) | 40.6 | 40.1 | 40.3 | 40.0 |
| Static Stability | 2 | 10 | 8 | 10 |
| Dynamic Stability | 1 | 10 | 8 | 9 |
| Primary Particle Size (μm) of Zeolite | 0.8 | 0.8 | 0.8 | 0.8 |
| Calcium Exchange Capacity (mg/g of anhydrous zeolite) | 168 | 168 | 168 | 166 |
| Calcium Exchange Speed Coefficient ($min^{-\frac{1}{2}}$) | 2.8 | 2.8 | 2.9 | 2.9 |

| | Comparative Samples | | | |
|---|---|---|---|---|
| Sample No. | H-1 | H-2 | H-3 | H-4 |
| Neutralizing Agent | | | | |
| Kind | sulfuric acid | sulfuric acid | sulfuric acid | — |
| amount (meq/100 g of anhydrous zeolite | 12.8 | 5.8 | 20.0 | — |
| pH Value of Slurry | | | | |
| just after completion of addition of neutralizing agent | 11.0 | 12.8 | 9.4 | — |
| after 4 hours | 12.2 | 12.8 | 11.1 | — |
| Addition of Carboxymethyl Cellulose | not added | added | added | added |
| Viscosity (cP at 20° C.) after preparation | 110 | 185 | 270 | 152 |
| Anhydrous Zeolite Concentration (%) | 40.2 | 40.6 | 39.8 | 40.5 |
| Static Stability | 6 | 4 | 7 | 2 |
| Dynamic Stability | 2 | 4 | 2 | 3 |
| Primary Particle Size (μm) of Zeolite | 0.8 | 0.8 | 0.8 | 0.8 |
| Calcium Exchange Capacity (mg/g of anhydrous zeolite) | 168 | 168 | 163 | 168 |
| Calcium Exchange Speed Coefficient ($min^{-\frac{1}{2}}$) | 2.8 | 2.8 | 2.7 | 2.8 |

The physical properties in Table 1 were determined according to the following methods.

(1) Measurement of pH Value of Slurry:

A glass beaker was charged with 100 ml of the sample slurry, and a glass electrode (provided with a reference electrode and a thermometer) was immersed in the sample and the pH value was read after passage of 3 minutes at 20° C. As the pH meter, Model HM5A supplied by Toa Denpa K.K. was used.

(2) Measurement of Viscosity (by B-type viscometer):

The sample slurry was charged in a beaker having a capacity of 1000 ml so that air bubbles were not contained in the slurry. The temperature of the slurry was adjusted to 20° C. and a measurement rotor of a B-type viscometer was immersed in the slurry so that the standard line was located on the liquid level of the slurry. The rotor was rotated at 20 rpm for 1 minute and the torsion of the spring was read from the measurement scale. The read value was multiplied by the factor of the rotor and the viscosity was expressed in the unit of cP (centipoise).

(3) Measurement of Static Stability:

A 1000-ml capacity wide-mouthed bottle having an inner diameter of about 95 mm and a height of about 150 mm was charged with 750 ml of the sample slurry, and the bottle was plugged and the slurry was allowed to stand in a room maintained at 25° C. for 96 hours. Then, 5 panelers checked whether a supernatant was formed or not, whether or not precipitates were formed in the slurry on the bottom portion and how hard the precipitates were. The static stability of the slurry was evaluated according to the following scale.

| Evaluation Value | Content of Evaluation |
|---|---|
| 10 | no supernatant, no precipitate |
| 9 | trace of supernatant, no precipitate |
| 8 | about 5% by volume of supernatant, no precipitate |
| 7 | about 5% by volume of supernatant, trace of precipitate |
| 6 | about 5% by volume of supernatant, precipitate covering all the bottom surface and adhering to glass rod |
| 5 | about 5% by volume of supernatant, about 3% by volume of precipitate in which glass rod stuck |
| 4 | about 5% by volume of supernatant, about 5% by volume of precipitate in which glass rod stuck |
| 3 | about 5% by volume of supernatant, about 8% by volume of precipitate, in a part of which glass rod could not stick |
| 2 | about 8% by volume of supernatant, about 15% by volume of precipitate in which glass rod could not stick |
| 1 | about 15% by volume of supernatant, about 20% by volume or more of precipitate in which glass rod could not stick |

(4) Measurement of Dynamic Stability:

A 150-ml capacity wide-mouthed transparent bottle having an inner diameter of about 60 mm and a height of about 60 mm was charged with 150 ml of the sample slurry, and the bottle was plugged and secured to a top plate of a shaking machine (Eyela Shaker Mini SS-80 supplied by Tokyo Rika Kikai K.K.). The sample slurry was shaken with horizontal amplitudes of 50 mm in the direction x and 30 mm in the direction y at a frequency of 68 shakings per minute for 16 hours. The presence of the supernatant was checked and the slurry in the upper portion of the bottle was discharged by decantation. Then, 5 panelers checked whether or not precipitates were formed or how hard the precipitates were. The dynamic stability was evaluated according to the following scale.

| Evaluation Value | Content of Evaluation |
|---|---|
| 10 | no precipitate |
| 9 | no precipitate but some resistance felt when glass rod was moved on bottom surface |
| 8 | no precipitate but apparent resistance felt when glass rod was moved on bottom surface, but when bottle was inclined, all the content flowed away |
| 7 | precipitate sticking to glass rod, resistance felt on glass rod |
| 6 | when glass rod stuck into content, it reached the bottom, but considerably solid precipitate was present, which was not discharged even when bottle was inclined |
| 5 | about 3% by volume of precipitate mentioned in 6 above |
| 4 | about 5% by volume of precipitate mentioned in 6 above |
| 3 | very solid precipitate in which glass rod could not stick, and slightly hard layer formed thereon |
| 2 | about 10% by volume of solid precipitate on which slightly hard layer was not formed |
| 1 | about 20% by volume of solid precipitate on which slightly hard layer was not formed |

(5) Measurement of Amount of Free Alkali Metal Ion:

The sample slurry was filtered by a filter paper (filter paper No. 6 for analysis supplied by Toyo Roshi K.K.) to obtain a filtrate, and about 10 g of the filtrate was precisely weighed and titrated with a 0.05N solution of HCl by using Methyl Orange as an indicator (having a color-changing pH value of 3.1 to 4.4). The $Na_2O$ concentration (% by weight) in the filtrate was determined as the amount of the free alkali metal ion.

(6) Measurement of Anhydrous Zeolite Concentration:

About 5 g of the slurry was sampled in a platinum crucible and calcined in an electric muffle furnace maintained at 800° C. for 60 minutes. The anhydrous zeolite concentration was calculated from the weight of the residue.

(7) Measurement of Primary Particle Size (Dp):

The sample was observed by an electron microscope in the state where respective particles were sufficiently dispersed, and the length of one size of a cubic particle directly measured was adopted as the primary particle size (Dp). This primary particle size was determined according to the following procedures.

An appropriate amount of a fine powdery sample was placed on a glass sheet, and paraffin wax or vaseline in a volume substantially equal to the volume of the sample was added to the sample. The mixture was sufficiently kneaded by a small stainless steel spatula. A small amount of ethanol was added to the kneaded mixture and the mixture was sufficiently kneaded on the glass sheet. The kneaded mixture was placed on a mesh for electron microscope measurement and dipped in ethanol to dissolve out the paraffin wax or the like, and the residue was applied in a drier maintained at 60° to 70° C. for 1 hour to evaporate ethanol.

According to the customary method, the electron microscopic observation was carried out at a direct electron microscope magnifying power of 1000 to 2000 and a photograph enlargement ratio, of 10, and four electron microscope photographs of 10,000 to 20,000 magnifications suitable for measurement of the primary particle size, which differed in the visual field, were taken.

Six typical particles were chosen from cubic particles present in the visual field, and with respect to each chosen particle, the length of the side regarded as being substantially parallel to the plane of the visual field (plane of the mesh) was measured. The maximum value among the measured values was used as the primary particle size (Dp).

(8) Measurement of Calcium Exchange Capacity:

The sample was precisely weighed so that the amount of the anhydrous zeolite was about 0.5 g and was then charged in a beaker having a capacity of 1500 ml. Deionized water was then added so that the volume of the charge in the beaker was exactly 250 ml. The charge was sufficiently dispersed by a magnetic stirrer and 250 ml of hard water (20° C.) containing 600 mg/l of CaO, which was prepared by using $CaCl_2$ of the special reagent grade, was added to the charge in the beaker at a time. The mixture was stirred for 10 minutes and immediately filtered through a filter paper (filter paper No. 6 supplied to Toyo Roshi K.K.). Precisely measured 20 ml of the filtrate was sampled and was diluted with deionized water so that the volume was about 100 ml. Then, 2 to 3 ml of $NH_3$—$NH_4Cl$ Dotite reagent and 0.5 ml of a 0.01M solution of Zn-EDTA were added to the solution. Titration was carried out with a 0.01M standard solution of EDTA by using Dotite reagent BT (Eriochrome Black T) as an indicator, and the calcium exchange capacity (mg of CaO per gram of anhydrous zeolite) was calculated according to the following equation:

$$\text{Calcium exchange capacity (CaO mg/g)} = \frac{300 - 28 \times C \times F}{2a \times b/100}$$

wherein a stands for the weight (g) of the sample, b stands for the anhydrous zeolite content (%), C stands for the titration amount (ml) of the 0.01M EDTA solution and F stands for the titrimetric factor of the 0.01M EDTA solution.

(9) Measurement of Calcium Ion Exchange Speed:

Hard water containing about 300 mg/l of CaO (DH=30, $Ca^{++}$ content=214.3 mg/l) was prepared, and the pH value was adjusted to 10.0 by using a 0.1N NaOH solution. Then, 500 ml of this calcium-containing solution was charged in a 1-liter capacity beaker and heated at 30° C., and the solution was stirred by a stirrer (magnetic stirrer Model A-2 supplied by Mitamura Co. Ltd.). Separately, 0.500 g of the sample which had been dried for 2 hours in a thermostat drier maintained at 110° C. was precisely weighed by a fixed reciprocal sensitivity, direct-reading balance, and the sample was thrown into the above-mentioned calcium-containing solution. The resulting mixture was subjected to any of the following three treatments (a), (b) and (c).

(a) The mixture was stirred for 30 seconds after throwing of the sample to contact the sample with the calcium-containing solution, and the mixture was immediately filtered by using a filter paper No. 6. The time for contact between the sample and the calcium-containing solution was adjusted to substantially 1 minute.

(b) The mixture was stirred for 90 seconds, and the mixture was immediately filtered in the same manner as in (a) above. The time for contact between the sample and the calcium, containing solution was adjusted to substantially 2 minutes.

(c) The mixture was stirred for 150 seconds after throwing of the sample, and the mixture was immediately filtered in the same manner as in (a) and (b) above. The time for contact between the sample and the calcium-containing solution was adjusted to substantially 3 minutes.

Then, precisely measured 10 ml of the filtrate was collected and diluted with deionized water so that the volume was about 50 ml. Then, 4 ml of 8N KOH was added to the dilution to adjust the pH value to 12, and drops of 5% KOH were added and 0.1 g of a Dotite NN indicator was further added. Then, titration was carried out with a 0.01N aqueous solution of EDTA. The measured values were plotted on a semi-lagarithmic graph, and a most proper straight line was drawn and the calcium ion exchange speed coefficient K was calculated from the gradient of this straight line according to the following equation.

Incidentally, in the case where the exchange speed was too high and the concentration determined after 1 minutes' contact was substantially the same as the concentrations determined after 2 minutes' contact and 3 minutes' contact, the contact time was adjusted to 10 to 20 seconds and the measurement was conducted again to determine the value K.

$$\log \frac{C}{Co} = -\frac{K}{10}\sqrt{t}$$

wherein Co stands for the concentration (mg/l) of the calcium ion (CaO, mg/l) in starting hard water, C stands for the concentration (mg/l) of the calcium ion (CaO) in the filtrate recovered after exchange of the calcium ion, t stands for the time (minutes) for exchange of the calcium ion, and K stands for the calcium ion exchange speed coefficient ($min^{-\frac{1}{2}}$).

EXAMPLE 2

Carbon dioxide was blown at a flow rate of 1 l/min into 1 Kg of the zeolite slurry A-1 obtained in Example 1, and when blowing was conducted for about 3 minutes, the pH value was 11.0. When this zeolite slurry was allowed to stand still for 4 hours, the pH value was increased to 12.1.

In the same manner as described in Example 1, carboxymethyl cellulose was added in an amount of 0.5% based on the anhydrous zeolite to the above zeolite slurry and the slurry was subjected to a dispersing treatment by using a home mixer to form a zeolite slurry 2-1 having an improved stability.

Carbon dioxide was blown into the above-mentioned slurry A-1 so that the pH value was 12.6, 11.5, 10.5 or 9.6. Thus, there were prepared neutralized samples H-5, 2-2, 2-3 and H-6.

The properties described in Example 1 were determined with respect to each sample. The obtained results are shown in Table 2.

Incidentally, the amount (meq/100 g of anhydrous zeolite) of added carbon dioxide was determined according to the following procedures.

When 4 hours had passed from the time of addition of carbon dioxide, 3 g of the slurry was precisely weighed and charged in a Schrötter alkali-meter for analysis of carbon dioxide gas. According to customary procedures, 6N hydrochloric acid was gradually dropped and $CO_2$ gas formed was introduced into a gas chromatograph (supplied by Shimazu Seisakusho K.K., Polapack column, 3 m, 40° C.) to determine the quantity of $CO_2$, and the milliequivalent (meq) number of $CO_2$ per 100 g of the anhydrous zeolite in the slurry was calculated.

TABLE 2

| | Samples of Present Invention | | | Comparative Samples | |
|---|---|---|---|---|---|
| Sample No. | 2-1 | 2-2 | 2-3 | H-5 | H-6 |
| Neutralizing Agent | | | | | |
| kind | $CO_2$ | $CO_2$ | $CO_2$ | $CO_2$ | $CO_2$ |
| amount (meq/100 g of anhydrous zeolite) | 9.0 | 3.4 | 14.0 | 1.1 | 26.8 |
| pH Value of Slurry | | | | | |
| just after addition of neutralizing agent | 11.0 | 11.5 | 10.5 | 12.6 | 9.5 |
| after 4 hours | 12.1 | 12.4 | 11.6 | 12.9 | 10.1 |
| Viscosity (cP, 20° C.) after Preparation | 214 | 222 | 220 | 205 | 216 |
| Concentration (%) of Anhydrous Zeolite | 40.7 | 40.7 | 40.6 | 40.6 | 40.7 |
| Static Stability | 10 | 9 | 10 | 3 | 6 |
| Dynamic Stability | 10 | 10 | 9 | 5 | 3 |
| Primary Particle Size (μm) of Zeolite | 0.8 | 0.8 | 0.8 | 0.8 | 0.8 |

TABLE 2-continued

| Sample No. | Samples of Present Invention | | | Comparative Samples | |
|---|---|---|---|---|---|
| | 2-1 | 2-2 | 2-3 | H-5 | H-6 |
| Calcium Ion Exchange Capacity mg/g of anhydrous zeolite) | 168 | 168 | 168 | 168 | 160 |
| Calcium Ion Exchange Speed Coefficient (min$^{-\frac{1}{2}}$) | 2.9 | 2.8 | 2.9 | 2.7 | 2.6 |

EXAMPLE 3

In this Example, the neutralization treatment was carried out by using nitric acid, hydrochloric acid, acetic acid, citric acid, oxalic acid, hydrochloric acid+oxalic acid and carbon dioxide+nitric acid.

The zeolite slurry A-1 obtained in Example 1 was charged into seven stainless steel vessels, and in each vessel, the neutralization treatment was carried out. In case of hydrochloric acid+oxalic acid, a mixed acid solution was prepared from 25 g of 20% hydrochloric acid and 50 g of 10% oxalic acid, and this mixed acid solution was used for the neutralization. In case of carbon dioxide+nitric acid, carbon dioxide was blown into the zeolite slurry with stirring until the pH value of the slurry was 12, and then 20% nitric acid was added to the slurry so that the pH value was 11.

Then carboxymethyl cellulose was added in an amount of 0.5% based on the zeolite solids to each neutralized slurry, and the slurry was subjected to a dispersing treatment with stirring to form a zeolite slurry having an improved stability.

The properties described in Example 1 were determined with respect to each sample. The obtained results are shown in Table 3.

TABLE 3

| Sample No. | Samples of Present Invention | | | | | | |
|---|---|---|---|---|---|---|---|
| | 3-1 | 3-2 | 3-3 | 3-4 | 3-5 | 3-6 | 3-7 |
| Neutralizing Agent | | | | | | | |
| kind | 20% $HNO_3$ | 20% HCl | 10% acetic acid | 10% citric acid | 10% oxalic acid | HCl+ oxalic acid | $CO_2$+ $HNO_3$ |
| amount (meq/100 g of anhydrous zeolite) | 13.3 | 13.0 | 14.4 | 14.7 | 14.5 | 13.7 | 11.9 |
| pH Value of Slurry | | | | | | | |
| just after addition of neutralizing agent | 10.9 | 11.0 | 11.2 | 11.1 | 11.0 | 11.1 | — |
| after 4 hours | 12.0 | 12.1 | 12.1 | 12.1 | 12.2 | 12.0 | 11.7 |
| Viscosity (cP at 20° C.) after preparation | 243 | 236 | 204 | 194 | 181 | 199 | 213 |
| Concentration (%) of Anhydrous Zeolite | 40.2 | 40.3 | 40.5 | 40.5 | 39.8 | 40.0 | 40.4 |
| Static Stability | 9 | 9 | 9 | 9 | 9 | 9 | 10 |
| Dynamic Stability | 9 | 9 | 9 | 9 | 7 | 8 | 9 |
| Primary Particle Size (μm) of Zeolite | 0.8 | 0.8 | 0.8 | 0.8 | 0.8 | 0.8 | 0.8 |
| Calcium Ion Exchange Capacity (mg/g of anhydrous zeolite) | 168 | 168 | 168 | 168 | 167 | 167 | 168 |

EXAMPLE 4

In this Example, the neutralization treatment was carried out by using sodium hydrogencarbonate, which is an acidic salt.

To 1 Kg of the slurry A-1 prepared in Example 1 was added 4.26 g of commercially available sodium hydrogen-carbonate of the reagent grade. The pH value of the slurry after addition of the neutralizing agent was 11. Then, 0.25 g of carboxymethyl cellulose was added to the neutralized slurry and the slurry was subjected to dispersing treatment by using a home mixer to form a zeolite slurry (sample 4-1) having an improved stability.

For comparison, a comparative sample (H-7 or H-8) was prepared in the same manner as described above except that sodium carbonate was used as the neutralizing treatment instead of sodium hydrogencarbonate.

The properties of each sample were determined. The obtained results are shown in Table 4.

TABLE 4

| Sample No. | Sample of Present Invention | Comparative Samples | |
|---|---|---|---|
| | 4-1 | H-7 | H-8 |
| Neutralizing Agent | | | |
| kind | sodium hydrogen carbonate | sodium carbonate | sodium carbonate |
| amount (meq/100 g of anhydrous zeolite) | 12.5 | 12.5 | 25.0 |
| pH Value of Slurry | | | |
| just after addition of neutralizing agent | 11.0 | 13.1 | 13.1 |
| after 4 hours | 11.9 | 13.1 | 13.1 |
| Viscosity (cP at 20° C.) after Preparation | 299 | 1270 | 12640 |
| Concentration (%) of Anhydrous Zeolite | 40.0 | 40.1 | 40.0 |
| Static Stability | 9 | 7 | 10 |
| Dynamic Stability | 8 | 3 | 7 |
| Primary Particle Size (μm) of Zeolite | 0.8 | 0.8 | 0.8 |
| Calcium Ion Exchange Capacity (mg/g of anhydrous zeolite) | 170 | 170 | 170 |

EXAMPLE 5

In this Example, the effects of carboxymethyl starch, sodium alginate and polyvinyl alcohol as the water-soluble polymeric dispersant were examined.

A 2-liter capacity stainless steel vessel was charged with 1 Kg of the zeolite slurry A-1 prepared in Example 1, and a 20% aqueous solution of sulfuric acid was dropped to the slurry to form a zeolite slurry having a pH value of 11. Then, 0.25%, based on the zeolite slurry, of a dispersant shown in Table 5 was added to the slurry with stirring to obtain a zeolite slurry excellent in the static stability and dynamic stability.

The properties described in Example 1 were determined with respect to each sample. The obtained results are shown in Table 5.

TABLE 5

| | Samples of Present Invention | | |
|---|---|---|---|
| Sample No. | 5-1 | 5-2 | 5-3 |
| Polymeric Dispersant | carboxymethyl starch | sodium alginate | polyvinyl alcohol |
| Viscosity (cP at 20° C.) after Preparation | 778 | 990 | 415 |
| Concentration (%) Anhydrous Zeolite | 40.5 | 40.6 | 40.6 |
| Static Stability | 8 | 8 | 7 |
| Dynamic Stability | 7 | 8 | 6 |
| Primary Particle Size (μm) of Zeolite | 0.8 | 0.8 | 0.8 |
| Calcium Ion Exchange Capacity (mg/g of anhydrous zeolite) | 168 | 167 | 167 |

EXAMPLE 6

In this Examples, influences of the anhydrous solid concentration in the zeolite slurry were examined.

A dilute alkaline solution having an $Na_2O$ concentration of 0.67% or a commercially available type NaA zeolite powder (supplied by Mizusawa Industrial Chemicals, Ltd.) having a crystal particle size of 0.8 μm was added to the zeolite slurry A-1 prepared in Example 1 so that the slurry came to have an anhydrous zeolite concentration shown in Table 6. Then, a 20% solution of hydrochloric acid was added to the slurry so that the pH value was 11.0. Then, 5 g of carboxymethyl cellulose was added to 1 Kg of the so treated slurry, and the slurry was subjected to a dispersing treatment by using a home mixer. The properties described in Example 1 were determined with respect to each sample. The obtained results are shown in Table 6.

TABLE 6

| | Samples of Present Invention | | | | | Comparative Samples |
|---|---|---|---|---|---|---|
| Sample No. | 6-1 | 6-2 | 6-3 | 6-4 | 6-5 | H-9 |
| Concentration (%) of Anhydrous Zeolite | 31.2 | 34.7 | 37.9 | 43.1 | 46.9 | 20.5 |
| Viscosity (cP at 20° C.) after Preparation | 43 | 101 | 163 | 332 | 938 | 24 |
| Static Stability | 5 | 7 | 9 | 10 | 10 | 2 |
| Dynamic Stability | 6 | 7 | 8 | 10 | 10 | 2 |
| Calcium Exchange Capacity (mg/g of anhydrous zeolite) | 170 | 170 | 170 | 170 | 170 | 170 |

EXAMPLE 7

In this Example, a synthetic zeolite for a detergent builder was prepared by using, as the starting silicic acid component, sodium silicate having an $SiO_2/Na_2O$ molar ratio of 2.5, which was obtained from a silica clay (terra alba) produced in Kagoshima-ken, Japan, and commercially available caustic soda, and sodium aluminate, and a zeolite slurry excellent in the static stability and dynamic stability was prepared by using the so prepared synthetic zeolite.

A 100-liter capacity stainless steel vessel equipped with a heater was charged with 11.2 Kg of the above-mentioned sodium silicate (having an $Na_2O$ content of 8.9% and an $SiO_2$ content of 21.5%), and 30 Kg of water was added with stirring. Then, 22.7 Kg of a soidum aluminate solution (having an $Na_2O$ concentration of 14.7% and an $Al_2O_3$ concentration of 15%) was gradually added to the mixture to form sodium aluminosilicate gel slurry. The slurry was aged with stirring at normal temperature for 24 hours, and the temperature was elevated to 90° C. and crystallization reaction was carried out in this state for 8 hours to form a zeolite crystal.

The molar ratios of the respective ingredients at the crystallization reaction were as follows.

$Na_2O/SiO_2=1.75$ $SiO_2/Al_2O_3=1.2$ $H_2O/Na_2O=42.7$

The so obtained zeolite crystal was separated from the mother liquor by filtration and washed with water, and water was removed to obtain 13 Kg of a type NaA zeolite cake having a water content of 60% based on the anhydrous zeolite obtained by drying at 800° C. and a pH value of 13.2 as measured at 20° C. The free alkali content in the zeolite cake was 0.67%.

The so obtained filter cake was stirred in a stainless steel vessel equipped with a stirrer to form a slurry. Carbon dioxide was blown at a rate of 10 l/min into the zeolite slurry with stirring for about 5 minutes to obtain a zeolite slurry having a pH value of 11.0. When this zeolite slurry was allowed to stand still for 4 hours, the pH value was increased to 12.2.

In the same manner as described in Example 1, carboxymethyl cellulose was added to the slurry in an amount of 0.5% based on the anhydrous zeolite, and the slurry was subjected to a dispersing treatment by a colloid mill (Micolloid L supplied by Tokushu Kika Kogyo K.K.) to obtain a zeolite slurry (sample 7-1) excellent in the static stability and dynamic stability. The properties described in Example 1 were determined with respect to the so obtained sample. The obtained results are shown in Table 7.

TABLE 7

| | Sample of Present Invention |
|---|---|
| Sample No. | 7-1 |
| Viscosity (cP at 20° C.) after Preparation | 395 |
| Static Stability | 9 |
| Dynamic Stability | 9 |
| Primary Particle Size (μm) of Zeolite | 1.2 |
| Calcium Exchange Capacity (mg/g of anhydrous zeolite) | 169 |

EXAMPLE 8

In this Example, influences of the free alkali metal component were examined.

The zeolite cake obtained in Example 1 was sufficiently washed with deionized water to obtain a slurry having a free alkali content of 0.056% or 0.11%. Furthermore, caustic soda of the reagent grade was added to the zeolite slurry A-1 prepared in Example 1 to form a slurry having a free alkali content of 0.61%, 0.96% or 1.20%. Carbon dioxide was blown into the slurries having free alkali contents of 0.11%, 0.61%, 0.96% and 1.20% to form neutralized slurries.

Each slurry was mixed with carboxymethyl cellulose in an amount of 0.5% based on the anhydrous zeolite and was then subjected to a dispersing treatment by using a home mixer.

The properties described in Example 1 were determined with respect to each of the so obtained slurries. The obtained results are shown in Table 8.

TABLE 8

| Sample No. | Samples of Present Invention 8-1 | 8-2 | 8-3 | Comparative Samples H-10 | H-11 |
|---|---|---|---|---|---|
| Neutralizing Agent | | | | | |
| kind | $CO_2$ | $CO_2$ | $CO_2$ | not added | $CO_2$ |
| amount (meq/100 g of anhydrous zeolite) | 4.9 | 27.5 | 43.2 | 0 | 54.0 |
| Free Alkali Content (%) in Starting Zeolite Slurry | 0.11 | 0.61 | 0.96 | 0.056 | 1.20 |
| Viscosity (cP at 20° C.) after Preparation | 215 | 336 | 895 | 201 | 2310 |
| Static Stability | 7 | 10 | 10 | 4 | 10 |
| Dynamic Stability | 8 | 10 | 10 | 7 | 6 |
| Primary Particle Size (μm) of Zeolite | 0.8 | 0.8 | 0.8 | 0.8 | 0.8 |
| Calcium Ion Exchange Capacity (mg/g of anhydrous zeolite) | 170 | 170 | 168 | 168 | 168 |

EXAMPLE 9

In this Example, the stabilization treatment was carried out by using various commercially available type A zeolites differing in the crystal particle size. More specifically, there were chosen and used (1) a type NaA zeolite powder (supplied by U.C.C.), (2) a type NaX zeolite powder (supplied by U.C.C.), (3) a type NaA zeolite powder (supplied by Toyo Soda K.K.), (4) a type NaA zeolite powder (supplied by Degussa) and (5) a type NaA zeolite powder (supplied by Mizusawa Industrial Chemicals, Ltd.).

The zeolite powder sample was added to deionized water charged in a stainless stell vessel with stirring to form a slurry having an anhydrous solid concentration of 40% by weight. Then, carbon dioxide was blown into the zeolite slurry to form a zeolite slurry having a pH value of 11. Then, carboxymethyl cellulose was added to the zeolite slurry in an amount of 0.5% based on the anhydrous solids in the slurry, and the slurry was sufficiently stirred by using a strong stirrer to obtain a zeolite slurry excellent in the static stability and dynamic stability.

The properties described in Example 1 were determined with respect to each of the so obtained slurries. The obtained results are shown in Table 9.

TABLE 9

| Sample No. | Samples of Present Invention 9-1 | 9-2 | 9-3 | 9-4 | 9-5 |
|---|---|---|---|---|---|
| Zeolite Powder | (1) | (2) | (3) | (4) | (5) |
| Viscosity (cP at 20° C.) after Preparation | 132 | 154 | 217 | 139 | 201 |
| Static Stability | 6 | 7 | 7 | 7 | 10 |
| Dynamic Stability | 6 | 7 | 8 | 7 | 10 |
| Primary Particle Size (μm) of Zeolite | 5 | 2 | 2 | 2.5 | 0.8 |
| Calcium Exchange Capacity (mg/g of anhydrous zeolite) | 140 | 120 | 140 | 150 | 170 |
| Calcium Exchange Speed Coefficient | 1.1 | 1.7 | 1.6 | 1.5 | 3.0 |

EXAMPLE 10

In this Example, influences of the amount added of the organic polymeric dispersant (carboxymethyl cellulose) were examined.

To 1 Kg of the sulfuric acid-neutralized zeolite slurry H-1 prepared in Example 1 was added carboxymethyl cellulose in an amount of 0.05, 0.1, 0.25, 0.5, 1 or 2% based on the anhydrous zeolite, and the slurry was sufficiently stirred to obtain a slurry.

The properties described in Example 1 were determined with respect to each of the so obtained slurries. The obtained results are shown in Table 10.

TABLE 10

| Sample No. | Samples of Present Invention 10-1 | 10-2 | 10-3 | 10-4 | 10-5 | Comparative Sample H-12 |
|---|---|---|---|---|---|---|
| Amount (%) of Carboxmethyl Cellulose | 0.1 | 0.25 | 0.5 | 1 | 2 | 0.05 |
| Viscosity (cP at 20° C.) after preparation | 130 | 150 | 255 | 1400 | 3100 | 115 |
| Static Stability | 7 | 8 | 10 | 10 | 10 | 6 |
| Dynamic Stability | 7 | 9 | 10 | 10 | 10 | 2 |
| Primary Particle Size (μm) of Zeolite | 0.8 | 0.8 | 0.8 | 0.8 | 0.8 | 0.8 |
| Calcium Exchange Capacity (mg/g of anhydrous | 168 | 168 | 168 | 166 | 164 | 168 |

EXAMPLE 11

Slurries corresponding to samples 1-1, 2-1 and 7-1 and comparative sample H-3 prepared in the foregoing Examples were prepared in large quantities and they were subjected to the actual transportation test according to the following procedures.

About 31 liters of the sample slurry was charged in a stainless steel vessel having a capacity of 36 liters (having an inner diameter of about 200 mm and a height of about 1150 mm), and the vessel was plugged and directly secured to a bed of a truck. Then, the truck was driven for about 13 hours (about 500 Km), the truck was kept stationary for about 5 hours, and the truck was driven again for about 13 hours (about 500 Km). Then, the flowability, viscosity and precipitation state of the slurry were observed with the naked eye by five panelers. The stability against precipitation on actual transportation was evaluated according to the following scale.

⊙ : stable suspension state, rich in flowability, and all the content flowed out from discharge opening of vessel ○: slight precipitation, and though precipitate was poor in flowability, it flowed out from vessel Δ: slight precipitation and some precipitates lacked flowability X: only supernatant flowed out and precipitates having no flowability left in vessel The obtained results are shown in Table 11.

TABLE II

| Sample No. | Samples of Present Invention 1-1 | 2-1 | 7-1 | Comparative Sample H-3 |
|---|---|---|---|---|
| Stability against Precipitation on Actual Transportation | ⊙ | ⊙ | ○ | X |

What is claimed is:

1. A process for the preparation of a zeolite slurry being excellent in both its staic stability and its dynamic stability and having a good flowability, which comprises stirring a wet cake containing water and zeolite in such a state that both are substantially inseparable from each other by filtration and further containing 0.1 to 1.0% by weight of free alkali to form a slurry of zeolite, blowing carbon dioxide gas into the zeolite slurry to neutralize the slurry so that the pH value ($P_1$) of the zeolite slurry at the time of completion of addition of said gas is in the range of from 10 to 11.5 and the pH value ($P_2$) of the zeolite slurry in the stationary state when 4 hours have passed from at time of completion of addition of said gas is in the range of from 11.5 to 12.5 and that the value of ($P_2-P_1$) is in the range of from 0.7 to 1.3, adding a water-soluble or water-dispersible organic polymeric dispersant in an amount of at least 0.1% by weight based on the anhydrous zeolite to the neutralized zeolite slurry, and subjecting the resulting slurry to highly shearing stirring.

2. A process according to claim 1, wherein said starting aqueous cake or slurry has such a concentration that the concentration of anhydrous zeolite solids in the final slurry is 30 to 50% by weight.

3. A process according to claim 1, wherein the zeolite has a CaO binding capacity of 120 to 180 mg/g.

4. A process according to claim 1, wherein the zeolite is a type A zeolite.

5. A process according to claim 13, wherein the zeolite has a primary particle size smaller than 1 μm.

6. A process according to claim 1, wherein the carbon dioxide gas is added to the slurry in an amount of 7 to 45 milliequivalents per 100 g of the anhydrous zeolite.

7. A process according to claim 1, wherein the water-soluble or water-dispersible organic polymeric dispersant is a dispersant containing carboxyl and hydroxyl groups.

8. A process according to claim 7, wherein th dispersant is carboxymethyl cellulose.

9. The process of claim 1 wherein the carbon dioxide is blown into the zeolite slurry while stirring the slurry.

10. A process for the preparation of a zeolite slurry being excellent in static stability and dynamic stability and having a good flowability, which comprises neutralizing an aqueous cake or slurry containing water and zeolite in such a state that both are substantially inseparable from each other by filtration, said aqueous cake or slurry containing an alkali ion in the following three states: (a) the alkali ion dissolved in the aqueous phase, (b) the alkali ion built in the crystal structure of zeolite particles and (c) the alkali ion present in the interface between the zeolite particles and the aqueous phase, with an inorganic or organic acid or an acid anhydride or acidic salt thereof so that the pH value ($P_1$) of the zeolite slurry at the time of completion of addition of said acid, acid anhydride or acidic salt is in the range of from 9.5 to 12 and the pH value ($P_2$) of the zeolite slurry in the stationary state when 4 hours have passed from the time of completion of addition of said acid, acid anhydride or acidic salt is in the range of from b 11.3 to 12.7, and that the value of ($P_2-P_1$) is in the range of from 0.7 to 1.3, thereby to neutralize all of the free alkali ion (a) and at least a part of the alkali ion (c) while the alkali ion (b) is not substantially neutralized, adding a water-soluble or water-dispersible organic polymeric dispersant in an amount of at least 0.1% by weight based on the anhydrous zeolite to the neutralized zeolite slurry, and subjecting the resulting slurry to highly shearing stirring.

11. The process of claim 10 wherein the step of neutralizing the aqueous cake or slurry containing water and zeolite with the inorganic or organic acid or acid anhydride or synthetic salt thereof comprises gradually adding an aqueous solution of the acid, acid anhydride or acidic salt to the zeolite slurry with stirring.

12. The process of claim 10 wherein the acid, acid anhydride or acidic salt is added to the slurry in an amount of from 7 to 45 milliequivalents per 100 g of the anhydrous zeolite.

13. The process of claim 11 wherein the aqueous cake or slurry is neutralized with an inorganic acid selected from the group consisting of sulfuric acid, sulfurous acid, hydrochloric acid, hydrobromic acid, hypochlorous acid, chloric acid, boric acid, nitric acid, phosphoric acid, phosphorous acid and metaphosphoric acid.

14. The process of claim 11 wherein the aqueous cake or slurry is neutralized with an organic acid selected from the group consisting of acetic acid, propionic acid, oxalic acid, citric acid, tartaric acid, succinic acid, maleic acid, malic acid, gluconic acid, itaconic acid, thioglycolic acid, ethylenediamine-tetraacetic acid, nitrilotriacetic acid, diglycolic acid, sulfoitaconic acid, trimellitic acid and pyromellitic acid.

* * * * *

UNITED STATES PATENT AND TRADEMARK OFFICE

CERTIFICATE OF CORRECTION

PATENT NO. : 4,622,166

DATED : November 11, 1986

INVENTOR(S) : TADAHISA NAKAZAWA, ET AL.

It is certified that error appears in the above-identified patent and that said Letters Patent is hereby corrected as shown below:

IN THE CLAIMS

Claim 1, line 13, (column 23, line 8), delete "at", insert --the--.

Claim 5, line 1, (column 23, line 24), delete "13", insert --1--.

Claim 8, line 1, (column 23, line 33), delete "th", insert --the--.

Claim 10, line 19, (column 24, line 10), delete "b".

Signed and Sealed this

Third Day of February, 1987

*Attest:*

DONALD J. QUIGG

*Attesting Officer*

*Commissioner of Patents and Trademarks*